US010039082B2

(12) United States Patent
Kim et al.

(10) Patent No.: US 10,039,082 B2
(45) Date of Patent: *Jul. 31, 2018

(54) METHOD AND APPARATUS FOR USER EQUIPMENT RECEIVING MBMS SERVICE PROCESSING SEMI-PERMANENT SCHEDULING FROM MBSFN SUBFRAME IN WIRELESS COMMUNICATION SYSTEM

(71) Applicant: Samsung Electronics Co., Ltd., Suwon-si, Gyeonggi-do (KR)

(72) Inventors: Sang Bum Kim, Suwon-si (KR); Soeng Hun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,687

(22) Filed: Jun. 7, 2016

(65) Prior Publication Data

US 2016/0286528 A1    Sep. 29, 2016

Related U.S. Application Data

(63) Continuation of application No. 14/115,198, filed as application No. PCT/KR2012/003492 on May 3, 2012, now Pat. No. 9,386,559.

(Continued)

(51) Int. Cl.
*H04W 72/00*    (2009.01)
*H04L 5/00*    (2006.01)
(Continued)

(52) U.S. Cl.
CPC ......... *H04W 72/005* (2013.01); *H04L 5/0082* (2013.01); *H04L 12/1881* (2013.01);
(Continued)

(58) Field of Classification Search
CPC combination set(s) only.
See application file for complete search history.

(56) References Cited

U.S. PATENT DOCUMENTS 6,829,227 B1    12/2004    Pitt et al.
7,808,953 B2    10/2010    Kuroda et al.
(Continued)

FOREIGN PATENT DOCUMENTS

CN    101022644 A    8/2007
CN    101047994 A    10/2007
(Continued)

OTHER PUBLICATIONS

Xi'an, China, Remaining Details of Transmission Mode 9 and DCI 2C, Oct. 11-15, 2010, Nokia Siemens Networks, R1-105534, 3GPP TSG RAN WG1 Meeting #62bis.*
(Continued)

*Primary Examiner* — Mounir Moutaouakil
(74) *Attorney, Agent, or Firm* — Jefferson IP Law, LLP

(57) ABSTRACT

The present invention relates to a method and an apparatus for a user equipment receiving MBMS service processing a semi-permanent scheduling from an MBSFN subframe. A method for a user equipment receiving the multimedia broadcast multicast service (MBMS) processing a downlink scheduling in a mobile communication system of the present invention comprises: a detection step of detecting the occurrence of the downlink scheduling in a random transmission time interval; a decision step of deciding whether to process the downlink scheduling, depending on whether the user equipment is set to a transmission mode 9 or whether the transmission time interval belongs to a multimedia broadcast multicast service single frequency network (MBSFN) subframe; and a processing step of processing or disregarding the downlink scheduling based on the result of the decision.

14 Claims, 10 Drawing Sheets

Related U.S. Application Data

(60) Provisional application No. 61/481,878, filed on May 3, 2011, provisional application No. 61/484,645, filed on May 10, 2011.

(51) Int. Cl.
*H04L 12/18* (2006.01)
*H04W 72/04* (2009.01)
*H04W 72/12* (2009.01)

(52) U.S. Cl.
CPC ..... *H04W 72/042* (2013.01); *H04W 72/0446* (2013.01); *H04W 72/1273* (2013.01)

(56) References Cited

U.S. PATENT DOCUMENTS

| | | | |
|---|---|---|---|
| 8,249,009 B2 | 8/2012 | Ishii et al. | |
| 8,666,440 B2* | 3/2014 | Shen | H04L 5/0048 370/318 |
| 8,687,555 B2* | 4/2014 | Ko | H04L 1/0026 370/328 |
| 8,842,622 B2* | 9/2014 | Zhang | H04B 7/024 370/203 |
| 8,867,440 B2 | 10/2014 | Ho et al. | |
| 9,007,933 B2* | 4/2015 | Wu | H04W 72/0406 370/252 |
| 9,185,682 B2* | 11/2015 | Hsu | H04W 72/00 |
| 9,307,498 B2 | 4/2016 | Baldemair et al. | |
| 2009/0093280 A1 | 4/2009 | Kitazoe | |
| 2009/0238098 A1 | 9/2009 | Cai et al. | |
| 2009/0257353 A1 | 10/2009 | Song et al. | |
| 2010/0034126 A1 | 2/2010 | Kitazoe et al. | |
| 2010/0110897 A1 | 5/2010 | Chun et al. | |
| 2010/0135892 A1 | 6/2010 | Bahr et al. | |
| 2010/0144299 A1 | 6/2010 | Ren | |
| 2010/0272086 A1 | 10/2010 | Jung et al. | |
| 2010/0285792 A1 | 11/2010 | Chen et al. | |
| 2010/0329170 A1 | 12/2010 | Wu | |
| 2010/0329188 A1* | 12/2010 | Jen | H04B 7/2606 370/328 |
| 2011/0021201 A1 | 1/2011 | Lee et al. | |
| 2011/0053490 A1 | 3/2011 | Wu | |
| 2011/0103251 A1 | 5/2011 | Ma et al. | |
| 2011/0116437 A1 | 5/2011 | Chen et al. | |
| 2011/0141987 A1 | 6/2011 | Nam et al. | |
| 2011/0171962 A1 | 7/2011 | Iwamura et al. | |
| 2011/0194428 A1 | 8/2011 | Wang et al. | |
| 2011/0194477 A1* | 8/2011 | Damnjanovic | H04W 72/005 370/312 |
| 2011/0267993 A1 | 11/2011 | Seo et al. | |
| 2011/0305184 A1* | 12/2011 | Hsu | H04L 65/4076 370/312 |
| 2012/0039233 A1 | 2/2012 | Kim et al. | |
| 2012/0093071 A1 | 4/2012 | Huang et al. | |
| 2012/0135773 A1* | 5/2012 | Shen | H04L 5/0048 455/513 |
| 2012/0176884 A1* | 7/2012 | Zhang | H04B 7/024 370/203 |
| 2012/0236776 A1 | 9/2012 | Zhang et al. | |
| 2012/0257562 A1 | 10/2012 | Kim et al. | |
| 2013/0003640 A1 | 1/2013 | Yang et al. | |
| 2013/0114573 A1 | 5/2013 | Suzuki et al. | |
| 2013/0121203 A1 | 5/2013 | Jung et al. | |
| 2013/0223323 A1 | 8/2013 | Jang et al. | |
| 2013/0322322 A1 | 12/2013 | Redana et al. | |
| 2013/0329711 A1 | 12/2013 | Seo et al. | |
| 2014/0022975 A1 | 1/2014 | Chen et al. | |
| 2014/0064133 A1 | 3/2014 | Kazmi et al. | |
| 2014/0161014 A1 | 6/2014 | Sasaki | |
| 2014/0355507 A1 | 12/2014 | Amerga et al. | |
| 2015/0016408 A1 | 1/2015 | Yang et al. | |
| 2015/0139068 A1 | 5/2015 | Jang et al. | |
| 2015/0146604 A1 | 5/2015 | Kim et al. | |
| 2016/0081045 A1 | 3/2016 | Bostrom et al. | |

FOREIGN PATENT DOCUMENTS

| | | |
|---|---|---|
| CN | 103119996 A | 5/2013 |
| CN | 103141041 A | 6/2013 |
| EP | 2180736 A1 | 4/2010 |
| JP | 2013-511896 A | 4/2013 |
| JP | 2013-533673 A | 8/2013 |
| JP | 2014-506059 A | 3/2014 |
| KR | 10-2009-0122174 A | 11/2009 |
| KR | 10-2011-0011554 A | 2/2011 |
| WO | 2008/136294 A1 | 11/2008 |
| WO | 2010/079951 A2 | 7/2010 |
| WO | 2010/145799 A1 | 12/2010 |
| WO | 2011/050564 A1 | 5/2011 |
| WO | 2013/014856 A1 | 1/2013 |

OTHER PUBLICATIONS

3GPP TSG RAN WG1 Meeting #63bis, R1-110284, "Supporting Format 1A in MBSFN Subframes for Rel-10 UE", Research In Motion, Jan. 17-21, 2011, Dublin, Ireland.

3rd Generation Partnership Project; Technical Specification Group Radio Access Network; Evolved Universal Terrestrial Radio Access (E-UTRA); Radio Resource Control (RCC); Protocol Specification (Release 10), 3GPP Standard; 3GPP TS 36.331, 3rd Generation Partnership Project (3GPP), Mar. 30, 2011, pp. 1-290, No. V10.1.0. Mobile Competence Centre, Sophia-Antipolis Cedex, France.

ETSI TS 136 321 V10.1.0, "LTE; Evolved Universal Terrestrial Radio Access (E-UTRA); Medium Access Control (MAC) Protocol Specification (3GPP TS 36.321 version 10.1.0 Release 10)", ETSI, Apr. 2011, France.

CATT, DL Assignment in MBSFN Subframe, 3GPP Draft; 36321_CRXXXX_(REL-20)_R2-111839, 3rd Generation Partnership Project (3GPP), Apr. 3, 2011, vol. RAN WG2, No. Shanghai, China; Apr. 11, 2011, Mobile Competence Centre, Sophia-Antipolis Cedex, France.

3rd Generation Partnership Project; Technical Specification Group Radio Access Network; Evolved Universal Terrestrial Radio Access (E-UTRA); User Equipment (UE) Radio Access Capabilities (Release 10), 3GP Standard; 3GPP TS 36.306, 3rd Generation Partnership Project (3GPP), Apr. 4, 2011, pp. 1-18, No. V10.1.0, Mobile Competence Centre, Sophia-Antipolis Cedex, France.

3rd Generation Partnership Project; Technical Specification Group Radio Access Network; Evolved Universal Terrestrial Radio Access( E-UTRA); Medium Access Control (MAC) Protocol Specification (Release 10), 3GPP Standard; 3GPP TS 36.321, 3rd Generation Partnership Project (3GPP), Apr. 5, 2011, pp. 1-53, No. V10.1.0, Mobile Competence Centre, Sophia-Antipolis Cedex, France.

Nokia Siemens Networks et al.; Correction on DL allocations in MBSFN subframes; 3GPP TSG-RAN WG2 Meeting #73bis; R2-112115; Apr. 11-15, 2011; Shanghai, CN.

Panasonic; Re-corrections to MBSFN subframe config on SIB2 handling; 3GPP TSG-RAN WG2 Meeting #73bis; R2-112309; Apr. 11-15, 2011; Shanghai, CN.

Chairman, Proposed Agenda, 3GPP Draft; RAN2 Notes Apr. 15, 1700, 3rd Generation Partnership Project (3GPP), Apr. 15, 2011, vol. RAN WG2, No. Shanghai, China; Apr. 11, 2011, Mobile Competence Centre, Sophia-Antipolis Cedex, France.

ETSI MCC, Draft Report of 3GPP TSG RAN WG2 meeting #73bis, 3GPP Draft; R2-11xxxx_Draft_Report_RAN2_73bis_Shanghai_Vo. 1, 3rd Generation Partnership Project (3GPP), Apr. 23, 2011, vol. RAN WG2, No. Barcelona, Spain, Mobile Competence Centre, Sophia-Antipolis Cedex, France.

3GPP, Draft3GPP TS 36.213 Va 1.0 (Mar. 2011) Technical Specification, published May 2011, see pp. 22-34.

Ericsson et al.; SPS reception in MBSFN subframes; 3GPP TSG-RAN WG2 Meeting #74; R2-113053; May 9-13, 2011; Barcelona, Spain.

CATT; PDSCH Transmission in unused MBSFN subframes; 3GPP TSG RAN WG2 Meeting #73bis; R2-111836; Apr. 11-15, 2011; Shanghai, CN.

(56) References Cited

OTHER PUBLICATIONS

Huawei et al: "Remaining issues regarding RLF reporting for MDT", 3GPP Draft; R2-111239 Remaining Issues Regarding RLF Reporting for MDT, 3rd Generation Partnership Project (3GPP), Mobile Competence Centre ; 650, Route des Lucioles ; F-06921 Sophia-Antipolis Cedex ; France, vol. RAN WG2, No. Taipei, Taiwan; Feb. 21, 2011, XP050493739; Taipei, Taiwan; Feb. 15, 2011.

"3rd Generation Partnership Project; Technical Specification Group Radio Access Network; Evolved Universal Terrestrial Radio Access (E-UTRA); User Equipment (UE) radio access capabilities (Release 10)", 3GPP Standard; 3GPP TS 36.306, 3rd Generation Partnership Project (3GPP), Mobile Competence Centre; 650, Route des Lucioles ; F-06921 SophiaAntipolis Cedex ; France, No. VI 0.0.0, Dec. 17, 2010 (Dec. 17, 2010), pp. 1-17, XP050462122; Dec. 17, 2010.

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.1.0; Mar. 30, 2011.

Huawei et al. "Extension to Radio Link Failure reporting for MDT and MRO", 3GPP TSG-RAN WG2 Meeting #72bis, R2-110101; Ireland, Dublin; Jan. 10, 2011.

Qualcomm Incorporated, PHR Trigger for Power Reduction Due to Power Management [online], 3GPP TSG-RAN2 #73 R2-110797, [retrieved on Oct. 30, 2017], Retrieved from the Internet: <URL: http://www.3gpp.org/ftp/tsg_ran/WG2_RL2/TSGR2_73/D ocs/R2-110797.zip> Feb. 14, 2011.

Ericsson, ST-Ericsson, Qualcomm Incorporated, Nokia Siemens Networks , Adding a Power management indication in PHR [online], 3GPP TSG-RAN2 #73 R2-111601; Taipei, Taiwan; Feb. 25, 2011.

3GPP TS 36.321 V10.0.0; Dec. 2010.

Ericsson, ST-Ericsson, Qualcomm Incorporated, Nokia Siemens Networks, Adding a Power Management indication in PHR, 3GPP TSG-RAN2 Meeting #73 R2-110940; Taipei, Taiwan; Feb. 25, 2011.

Ericsson, ST-Ericsson, Qualcomm Incorporated, Nokia Siemens Networks, Power Management indication in PHR, 3GPP TSG-RAN WG2#73 Tdoc R2-110941; Taipei, Taiwan; Feb. 14, 2011.

Media Tek Inc.Rel-10 PHR for non-CA UE, 3GPP TSG-RAN WG2 Meeting #72bis R2-110244, Jan. 11, 2011, http://www.3gpp.org/ftp/tsg_ran/WG2_RL2/TSGR2_72bis/Docs/R2-110244; Dublin, Ireland Jan. 11, 2011.

3GPP TS 36.331 V10.0.0; Dec. 21, 2010.

Qualcomm Incorporated, "Power Management Based PHR Trigger", 3GPP TSG-RAN2 Meeting #72bis, R2-110177; Dublin, Ireland; Jan. 11, 2011.

Qualcomm Incorporated, "Definition of Pcmax,c", 3GPP TSG RAN4 #57AH,R4-110567; Austin, Texas; USA Jan. 26, 2010.

3GPP: 3rd Generation Partnership Project; Technical Specification Group Radio Access Network; Evolved Universal Terrestrial Radio Access (E-UTRA); Physical layer procedures (Release 10), 3GPP Draft; DRAFT36213-A10, 3RD Generation Partnership Project (3GPP), Mobile Competence Centre ; 650, Route Des Lucioles; F-06921 Sophia-Antipolis Cedex; France, vol. RAN WG1, Mar. 24, 2011 (Mar. 24, 2011), XP050487473.

LG Electronics: Remaining Details on Transmission Mode 9, 3GPP Draft; R1-106322_DL_TM9, 3RD Generation Partnership Project (3GPP), Mobile Competence Centre; 650, Route Des Lucioles; F-06921 Sophia-Antipolis Cedex; France, vol. RAN WG1, no. Jacksonville, USA; Nov. 15, 2010, Nov. 10, 2010 (Nov. 10, 2010), XP050489820.

Nokia et al: Remaining details of transmission mode 9 control signaling, 3GPP Draft; R1-106206, 3RD Generation Partnership Project (3GPP), Mobile Competence Centre ; 650, Route Des Lucioles; F-06921 Sophia-Antipolis Cedex; France, vol. RAN WG1, no. Jacksonville, USA; Nov. 15, 2010, Nov. 9, 2010 (Nov. 9, 2010), XP050489651.

LG Electronics: Remaining Details on Transmission Mode 9,3GPP Draft; R1-106322_DL_TM9, 3RD Generation Partnership Project (3GPP), Mobile Competence Centre; 650, Route Des Lucioles; F-06921 Sophia-Anti Polis Cedex; France, vol. Ran WG1, no. Jacksonville, SA;Nov. 15, 2010, Nov. 10, 2010 (Nov. 10, 2010), XP050468239.

Research in Motion UK Limited; "Clarification of Rel-10 UE category and MIMO layer capability definition"; 3GPP TSG RAN WG1 Meeting #63bis; Dublin, Ireland, Jan. 17-21, 2011; R1-110283.

Nokia, Nokia Siemens Networks, "Considerations on release 10 UE categories", 3GPP TSG-RAN WG4#57 R4-104313, pp. 1-4.

HTC, "Clarification on UE capability", 3GPP TSG-RAN WG2#72bis R2-110059, pp. 1-6.

NTT DOCOMO, "Soft Buffer Partitioning and Rate Matching for Downlink CA", 3GPP TSG-RAN WG1#63bis R1-110555 pp. 1-10.

Ericsson, ST-Ericsson, "On Rel-10 UE capabilities", 3GPP TSG-RAN WG1# 63bis R1-110514, pp. 1-6.

* cited by examiner

METHOD AND APPARATUS FOR USER EQUIPMENT RECEIVING MBMS SERVICE PROCESSING SEMI-PERMANENT SCHEDULING FROM MBSFN SUBFRAME IN WIRELESS COMMUNICATION SYSTEM

CROSS-REFERENCE TO RELATED APPLICATION(S)

This application is a continuation of U.S. application Ser. No. 14/115,198, which was the National Stage of International application PCT/KR2012/003492 filed on May 3, 2012, which claimed the benefit under 35 U.S.C. § 119(e) of a U.S. Provisional application filed on May 3, 2011 in the U.S. Patent and Trademark Office and assigned Ser. No. 61/481,878, and of a U.S. Provisional application filed on May 10, 2011 in the U.S. Patent and Trademark Office and assigned Ser. No. 61/484,645, the entire disclosure of each of which is hereby incorporated by reference.

TECHNICAL FIELD

The present invention relates to a wireless communication system and, in particular, to a semi-persistent scheduling-processing method and apparatus of a user equipment receiving MBMS in MBSFN subframe.

BACKGROUND ART

The mobile communication system has been developed for the user to communicate on the move. With the rapid advance of technologies, the mobile communication system has evolved to the level capable of providing high speed data communication service as well as voice telephony service.

Recently, as one of the next generation mobile communication system, Long Term Evolution (LTE) is on the standardization by the 3rd Generation Partnership Project (3GPP). LTE is a technology designed to provide high speed packet-based communication of up to 100 Mbps and aims at commercial deployment around 2010 timeframe. In order to accomplish the aim, a discussion is being held on several schemes: one scheme for reducing the number of nodes located in a communication path by simplifying a configuration of the network, and another scheme for maximally approximating wireless protocols to wireless channels.

Meanwhile, unlike voice service, the data service is provided on the resource determined according to the data amount to be transmitted and channel condition. Accordingly, the wireless communication system, especially cellular communication, is provided with a scheduler manages transmission resource allocation in consideration of the required resource amount, channel condition, data amount, etc. This is the fact in the LTE system as the next generation mobile communication system, and the scheduler located at the base station (eNB) manages the transmission resource allocation.

Recent studies are focused on the LTE-Advanced (LTE-A) for improving data rate with the adaptation of several new techniques to legacy LTE system. Multimedia Broadcast/Multicast Service one of the techniques to enhanced along with the LTE-A system. MBMS is a broadcast service provided in the LTE system.

Meanwhile, it increases signaling overhead to provide scheduling information on every transmission of data burst for the traffic requiring periodic radio resource allocation such as VoIP. Accordingly, a scheduling technique for providing the user equipment (UE), in advance, with the scheduling information allocating radio resource periodically in order for the UE to transmit data on the radio resource allocated periodically is referred to as Semi-Persistent Scheduling (SPS).

However, there is no clear rule specified how to processing the situation when the downlink subframe having the downlink resource allocated through SPS and the resource for providing MBMS. There is therefore a need of defining operations of the UE clearly.

DISCLOSURE OF INVENTION

Technical Problem

The present invention has been conceived to solve the above problem and aims to provide a SPS processing method and apparatus that is capable of allowing the UE receiving MBMS to process SPS in MBSFN subframe.

Solution to Problem

In accordance with an aspect of the present invention, a downlink-scheduling processing method of a terminal receiving Multimedia Broadcast/Multicast Service (MBMS) in a mobile communication system includes detecting occurrence of downlink scheduling at a certain Transmission Time Interval (TTI), determining whether to process the downlink scheduling depending on whether the terminal is configured transmission mode 9 or the TTI matches Multimedia Broadcast/Multicast Service Frequency Network (MBSFN) subframe, and processing or ignoring the downlink scheduling according to determination result.

In accordance with another aspect of the present invention, a terminal for receiving Multimedia Broadcast Multicast Service (MBMS) and processing downlink scheduling in a mobile communication system includes a transceiver which transmits and receives signals to and from a base station and a controller which detects occurrence of downlink scheduling at a certain Transmission Time Interval (TTI), determines whether to process the downlink scheduling depending on whether the terminal is configured transmission mode 9 or the TTI matches Multimedia Broadcast/Multicast Service Frequency Network (MBSFN) subframe, and controls to process or ignore the downlink scheduling according to determination result.

Advantageous Effects of Invention

According to the present invention, the UE receiving MBMS operates in one of unicast processing mode and MBMS processing mode selectively depending on whether a certain transmission time interval (TTI) is of MBSFN or the UE is in operating in transmission mode 9. Accordingly, when the subframe in which downlink resource is allocated through SPS matches the subframe designated for MBMS, it is possible to define the operation of the UE for processing the subframe as the subframe of the downlink resource allocated through SPS or as the subframe for MBMS.

MODE FOR THE INVENTION

The present invention relates to a Semi-Persistent Scheduling (SMS) processing method and apparatus of a UE that is capable of processing SMS in MBSFN subframe.

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
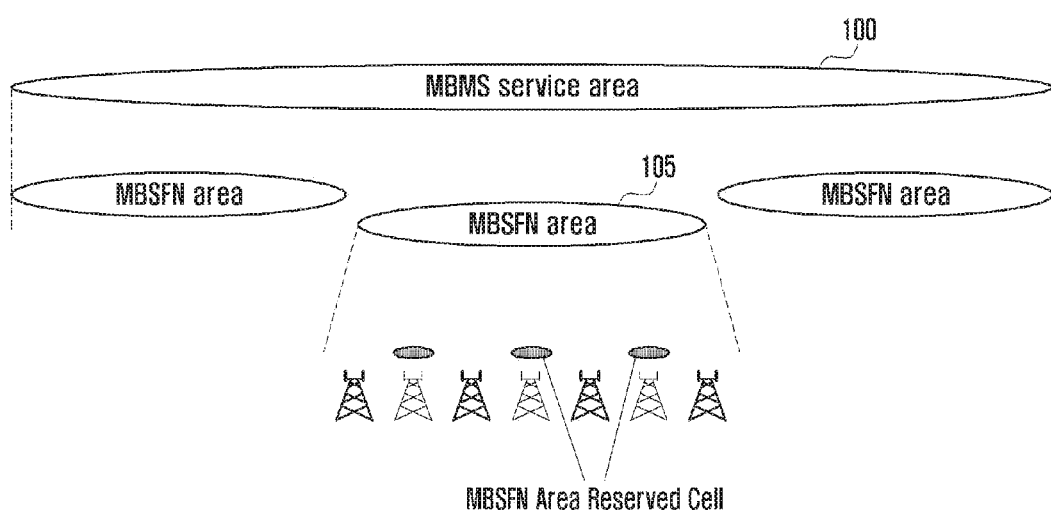
FIG. 1 is a diagram illustrating a concept of MBMS.

FIG. 1 is a diagram illustrating a concept of MBMS.

The MBMS service area 100 is a network area formed with a plurality of eNBs capable of Multimedia Broadcast/Multicast Service Single Frequency Network (MBSFN) transmission.

The MBSFN area 105 is the network area composed of several cells integrated for MBSFN transmission, and the cells of the MBSFN network are synchronized each other for MBSFN transmission.

All of the cells with the exception of MBSFN Area Reserved Cells 110 are used for MBSFN transmission. The MBSFN Area Reserve cell 110 are not used for MBSFN transmission but for other purpose on the radio resource allocated for MBSFN transmission with restricted transmit power.

Figure 2:
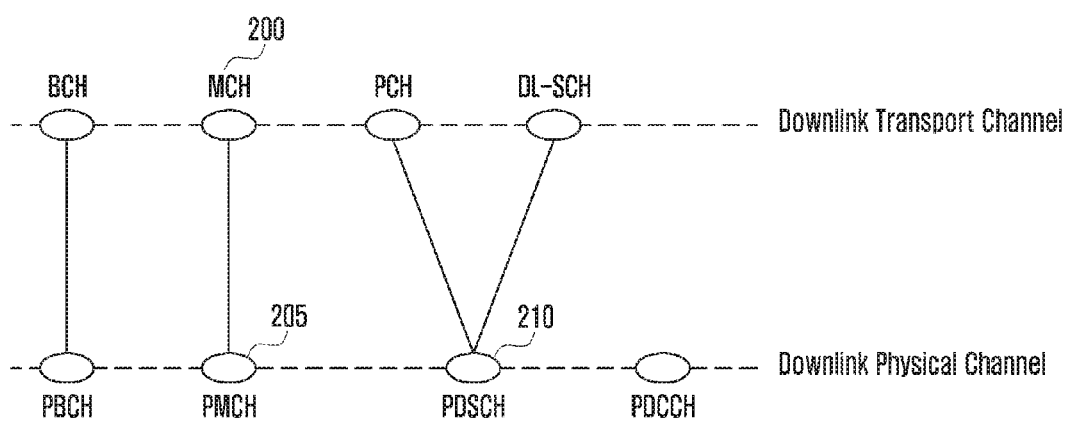
FIG. 2 is a diagram illustrating downlink channel mapping relationship for used in MBSFN transmission.

FIG. 2 is a diagram illustrating downlink channel mapping relationship for used in MBSFN transmission.

As shown in FIG. 2, MCH 200 is used between the MAC layer and the physical layer, and the MCH 200 is mapped to PMCH 205 of the physical layer.

Typically, the unicast scheme for transmitting data to a specific UE uses Physical Downlink Shared Channel (PDSCH) 210.

Figure 3:
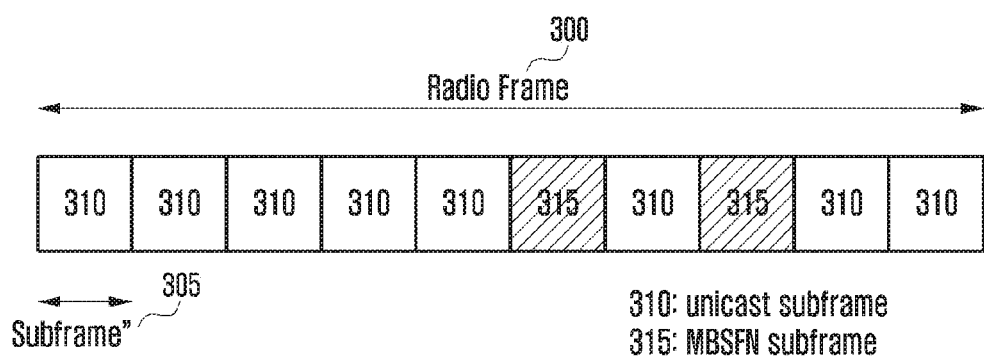
FIG. 3 is a diagram illustrating a structure of the downlink frame for use in the LTE system.

FIG. 3 is a diagram illustrating a structure of the downlink frame for use in the LTE system.

As shown in FIG. 3, a radio frame 300 consists of 10 subframes 305. Here, each subframe is classified into one of normal subframe 310 for use in normal data transmission and Multimedia Broadcast/Multicast Service Single Frequency Network (MBSFN) subframe 315.

The normal subframe and the MBSFN subframe are different from each other in number of Orthogonal Frequency Division Multiplexing (OFDM) symbols, length of cyclic prefix, and structure and number of Cell-specific Reference Signal (CRS).

Meanwhile, the MBSFN subframe is used for broadcasting/multi casting data in Rel-8 and Rel-9 systems. However, with the system advance, the MBSFN subframe can be used for unicast as well as broadcast/multicast in LTE Rel-10 or later.

In LTE, each UE is configured in a Transmission Mode (TM) associated with Multi-antenna technique and Reference Signal (RS) in order to use Physical Downlink Shared Channel (PDSCH) efficiently.

In LTE Rel-10, there are transmission modes of TM1 to TM9. Each UE is configured in one of the TMs for PDSCH transmission, TM8 introduced in Rel-9 and TM9 in Rel-10.

Particularly, TM9 supports Single User Multi-Input Multi-Output (SU-MIMO) having up to 8 ranks. TM9 supports multi-layer transmission up to 8 layers using Rel-10 Demodulation Reference Signal (DMRS) in demodulation. Although the Rel-10 DMRS is precoded, it is not necessary to notify the receiver of the corresponding precoder index. In order to support TM9, Downlink Control Information (DCI) format 2C is newly defined in Rel-10. It is noted that the terminals of releases prior to Rel-10 do not attempt decoding in MBSFN subframe. Accordingly, if it is required for all UEs to attempt decoding in MBSFN subframe, this means that the old release UEs has to be upgraded.

In the present invention, the MBSFN subframe-carrier unicast data reception capability is applied to the UEs requiring it, e.g. the UEs requiring high speed data communication, other than all UEs.

Among the aforementioned TMs, TM9 is the transmission mode of maximizing the transmission efficiency using multiple antennas. In the present invention, if it is required to increase the data throughput of a UE through unicast data reception in MBSFN subframe, the eNB configures the UE to operate in TM9 such that the UE operating in TM9 receives unicast data in MBSFN subframe.

For unicast data transmission, it is necessary to notify of the resource for transmitting data using PDCCH and the data are transmitted through PDSCH in the LTE system. The UE has to determine whether the PDCCH has the information on the resource allocated to the UE before receiving the actual data.

In the meantime, the resource allocation information for MBSFN is acquired through more complex procedure. The eNB notifies the UE of the transmission position of Multicast Control Channel (MCCH) per MBSFN Area through System Information Block 13 (SIB13) broadcast. The MCCH includes resource allocation information for MBSFN such that the UE decodes the MCCH to check the transmission position of MBSFN subframe.

As described above, the reason for providing the MBMS resource allocation information through a method different from the conventional unicast is because the MBMS has to be provided to even the UE in the idle mode. Accordingly, the transmission position of MCCH as control channel is notified using the SIB13 broadcast.

Figure 4:
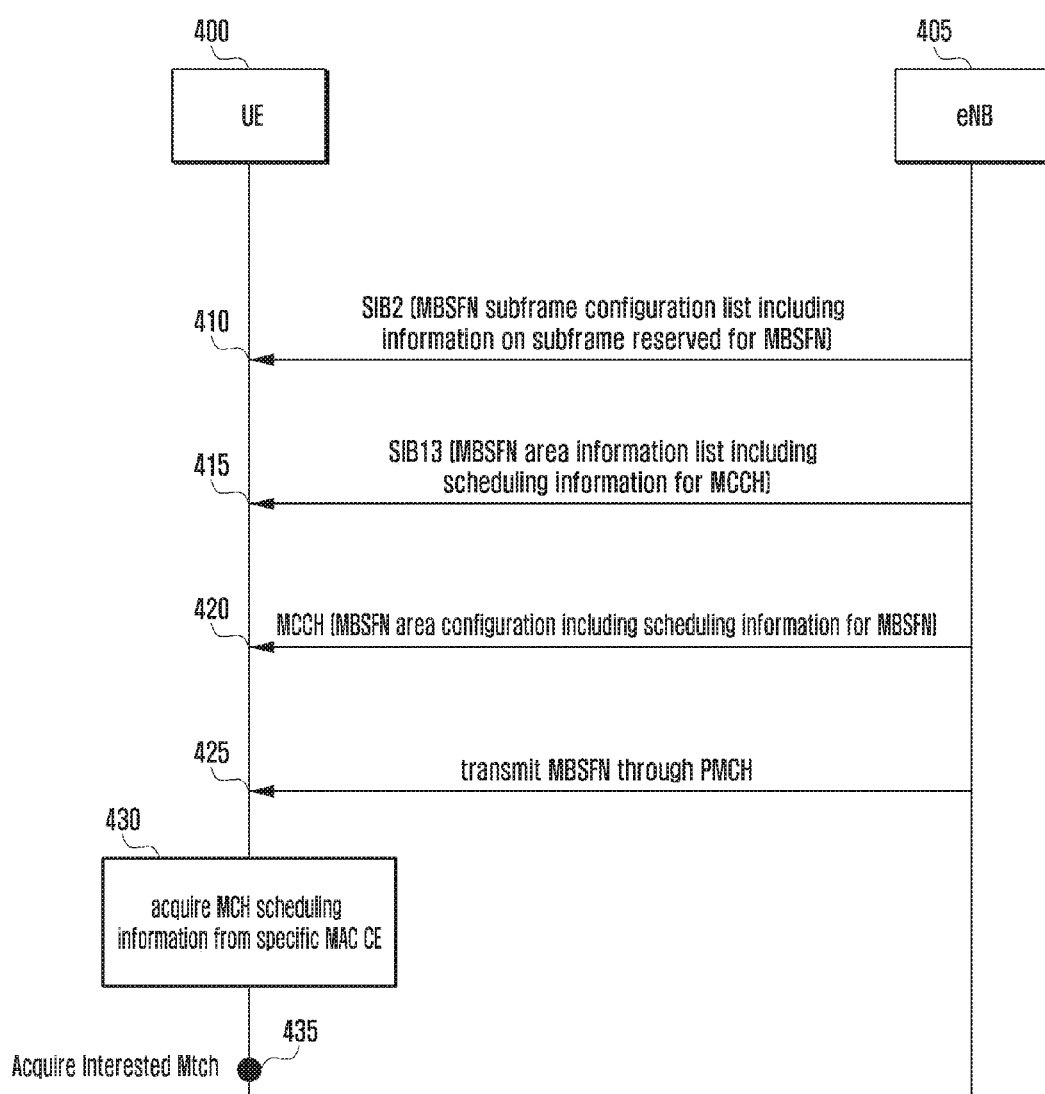
FIG. 4 is a signal flow diagram illustrating a MBSFN reception procedure of the UE.

FIG. 4 is a signal flow diagram illustrating a MBSFN reception procedure of the UE.

The UE 400 receives SIB2 broadcast by the eNB at step 410. The MBSFN-SubframeConfigList IE indicates the subframes capable of being used for MBSFN transmission. The MBSFN-SubframeConfigList IE includes MBSFN-SubframeConfig IE and indicates radio frame including MBSFN subframes and the subframes that can be used as MBSFN subframes in the radio frame. Table 1 shows an exemplary MBSFN-SubframeConfig IE.

TABLE 1

```
-- ASN1START
MBSFN-SubframeConfig ::=        SEQUENCE {
    radioframeAllocationPeriod      ENUMERATED {n1, n2,
n4, n8, n16, n32},
    radioframeAllocationOffset      INTEGER (0..7),
    subframeAllocation              CHOICE {
        oneFrame                        BIT STRING
(SIZE(6)),
        fourFrames                      BIT STRING
(SIZE(24))
    }
}
-- ASN1STOP
```

Here, the radio frame allocation period (radioFrameAllocationPeriod) and radio frame allocation offset (radioFrameAllocationOffset) are used for indicating the radio frame having MBSFN subframe, and the radio frame fulfilling equation "SFN mod radioFrameAllocationPeriod= radioFrameAllocationOffset" includes MBSFN subframes.

SFN is System Frame Number indicating the number of the radio frame. This repeats in the range from 0 to 1023. The subframe allocation (subframeAllocation) indicates the MBSFN subframes in the radio frame indicated by the equation. The indication may be done by one or four radio frames. In the case of using the unit of one radio frame, oneFrame IE indicates the subframe. Among the ten subframes of one radio frame, the $1^{st}$, $2^{nd}$, $3^{rd}$, $6^{th}$, $7^{th}$, $8^{th}$ subframes may be configured as MBSFN subframes. Accordingly, the oneFrame IE indicates the MBSFN subframe among the enumerated subframes using 6 bits. In the case of using the unit of four radio frames, the fourFrames IE indicates the MBSFN subframes. In order to cover four radio frames, total 24 bits are used to indicate MBSFN subframes among the enumerated subframes of every radio frame. Accordingly, the UE is capable of checking the subframe that may be configured as MBSFN subframes precisely.

If the terminal 400 wants to receive MBSFN data, it receives SIB13 broadcast by the eNB 405 at step 415. The MBSFN-AreaList IE of the SIB13 including position information on MCCH transmission per MBSFN area of the cell such that the UE receives MCCH based on this information at step 420.

The MBSFNAreaConfiguration IE of the MCCH indicates the position of the resource used for MBSFN transmission, and the UE receives MBSFN subframe using this information at step 425. The UE acquires the position of the MBSFN subframe carrying the wanted MTCH in the MCH scheduling information MAC CE as one of MAC Control Elements (CEs) of the received MAC PDU at step 430. The UE decodes the intended MTCH using the MCH scheduling information at step 435.

As described above, in LTE Rel-10, the subframe designated for MBSFN transmission may be used in unicast transmission only for the TM9 UE. That is, the subframe is reserved as MBSFN subframe in the MBSFN-SubframeConfigList IE of SIB2, it may be used for unicast. Such a subframe may overlap with Transmission Time Interval (TTI) in which downlink scheduling (DL assignment) occurs by Semi-Persistent Scheduling (SPS). In this case, an appropriate UE operation is required.

It increases signaling overhead to provide scheduling information on every transmission of data burst for the traffic requiring periodic radio resource allocation such as VoIP. Accordingly, a scheduling technique for providing the user equipment (UE), in advance, with the scheduling information allocating radio resource periodically in order for the UE to transmit data on the radio resource allocated periodically is referred to as Semi-Persistent Scheduling (SPS).

SPS is applicable to PCell but not SCell in a Carrier Aggregation (CA) mode.

Figure 5:
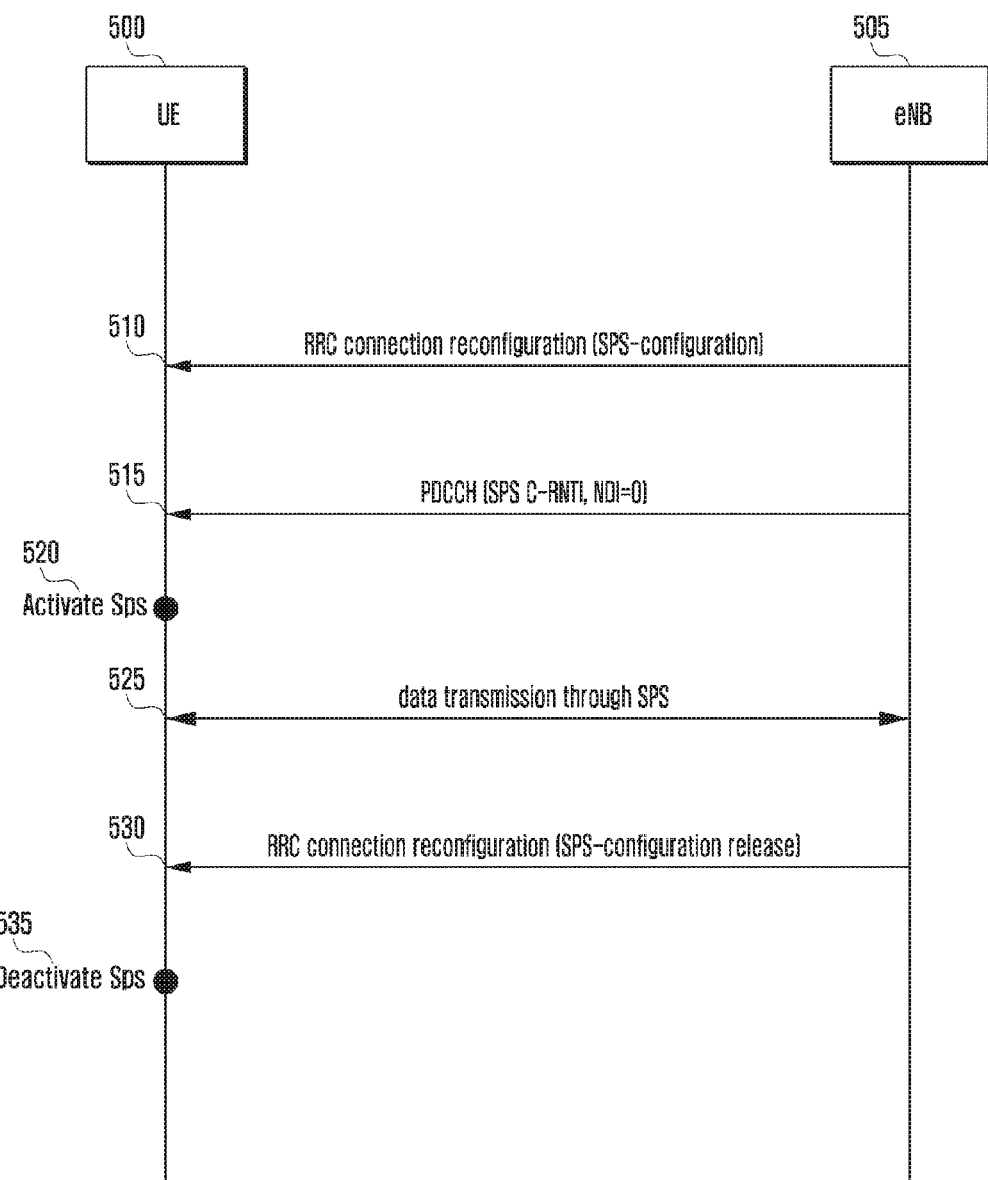
FIG. 5 is a signal flow diagram illustrating a procedure of activating and deactivating SPS.

FIG. 5 is a signal flow diagram illustrating a procedure of activating and deactivating SPS.

The SPS is activated and deactivated using RRC signaling and PDCCH basically.

If the UE 500 wants to receive the service generating data periodically such as VoIP, the eNB 505 transmits RRCConnectionReconfiguration message including IE SPS-Config at step 510. The corresponding IE includes SPS C-RNTI information, SPS interval, number of HARQ process, implicitReleaseAfter, etc. necessary for performing SPS.

Here, SPS C-RNTI is used for indicating the scheduling information for initial SPS transmission and retransmission. The SPS interval indicates the interval of allocating radio resource. The implicitReleaseAfter is described in association with the SPS deactivation procedure. The SPS activation is performed in such a way that the eNB sends the UE the SPS C-RNTI and E-PDCCH including New Data Indicator (NDI) set to 0 at step 515. The NDI is used to distinguish between initial transmission and retransmission and described using an example with reference to FIG. 6.

The UE starts SPS using the received SPS-Config information at step 520.

The UE transmits data suing the radio resource allocated periodically at step 525. In the state of transmitting data, if data transmission error occurs and thus retransmission is required, the eNB performs radio resource scheduling for retransmission separately in downlink. In uplink, however, retransmission is performed on the pre-designated radio resource. The retransmission-related operation is described with reference to FIG. 6.

If it is required to stop applying SPS, the eNB deactivates SPS at operation 530. For this purpose, the eNB uses IE SPS-Config in the RRCConnectionReconfiguration message. The RRC signaling-based SPS activation/deactivation is applicable to both the downlink and uplink.

It is also possible to deactivate SPS implicitly using implicitReleaseAfter information. The implicitReleaseAfter is set to an integer of {2, 3, 4, 8} and, if MAC PDUs containing no MAC SDU, due to no data to transmit in the uplink data transmission process, occur as much as indicated by implicitReleaseAfter, the UE deactivates SPS implicitly.

Figure 6:
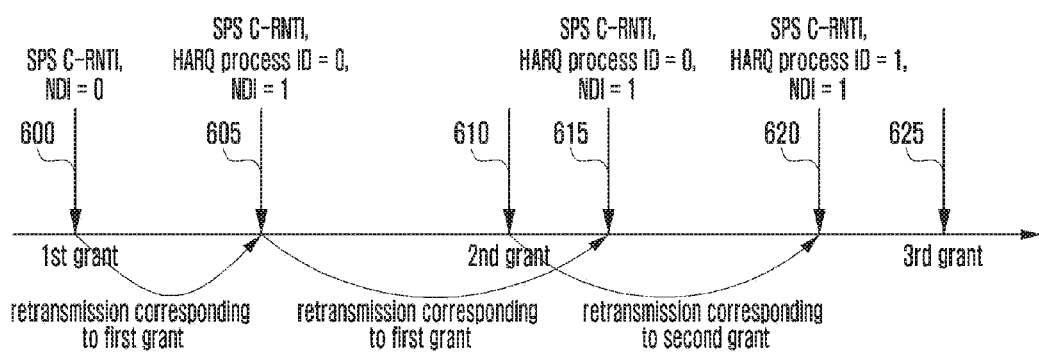
FIG. 6 is a diagram illustrating SPS operation and retransmission method in downlink.

FIG. 6 is a diagram illustrating SPS operation and retransmission method in downlink. If SPS operation is activated, although the radio resource for downlink data transmission is allocated periodically, the eNB has to allocate the radio resource for retransmission separately. For this purpose, the system uses NDI and HARQ process ID. The two IEs are sent to the UE in PDCCH along with SPS C-RNTI.

In the SPS operation, the New Data Indicator (NDI) is used for distinguishing between SPS initial transmission and retransmission. That is, if NDI is set to 0, this indicates SPS initial transmission. Otherwise if NDI is set to 1, this indicates that the corresponding scheduling information is for retransmission.

Meanwhile, the HARQ process ID is used to identify the data transmission for which the downlink scheduling (DL assignment) information is transmitted. Whenever data transmission occurs on the periodically allocated radio resource, the HARQ process ID increments by 1 and this is used to instruct the transmission of the corresponding data.

After receiving the RRCConnectionReconfiguration message including IE SPS-Config and activating the SPS operation, the UE receives PDCCH including SPS C-RNTI and NDI set to 0 at step 600. On the PDSCH corresponding to the PDCCH, the initial SPS transmission occurs.

However, if a transmission error occurs and thus the UE sends the eNB a NACK, the eNB sends the UE the scheduling information for retransmission at step 605. At this time, the SPS C-RNTI, HARQ process ID set to 0, and NDI set to 1 are included in PDCCH. The HARQ process ID indicates that the corresponding scheduling information is the retransmission downlink scheduling (DL assignment) information on the data transmitted at step 600. Also, the NDI indicates that the corresponding scheduling information is of retransmission.

At step 610, a new transmission corresponding to the periodic radio resource occurs. The scheduling information for retransmission is sent to the UE at operation 615. The UE is aware of the retransmission-related scheduling information based on the NDI set to 1 and determines, based on the HARQ ID, whether the scheduling information is the retransmission downlink scheduling (DL assignment) information on the first data or the retransmission downlink scheduling (DL assignment) information on the second data.

At step 620, the scheduling information for retransmission is sent to the UE again. At this time, since the HARQ process ID is set to 1, the scheduling information is the downlink scheduling (DL assignment) information corresponding to the second data transmission. The third data transmission occurs at step 625.

As described above, the subframe designated for MBSFN transmission may be used in unicast transmission only for the TM9 UE and may overlap with TTI of downlink scheduling (DL assignment) of SPS.

The present invention proposes the UE operation appropriate for such a situation. The present invention also includes a procedure in which the UE provides the eNB of MBMS counting information such that the eNB is capable of determining the frequency or cell for providing a certain MBMS service.

When the TTI of scheduling (assignment) caused by SPS matches the MBSFN subframe in downlink, the TM9 UE has no need to process the downlink scheduling (DL assignment) but non-TM9 UE which is not capable of using the MBSFN subframe for unicast transmission ignores the downlink scheduling (DL assignment).

If it is necessary for the TM9 UE to process PMCH in the corresponding MBSFN subframe, the TM9 UE ignores the downlink scheduling (DL assignment). If it is not necessary for the TM9 UE to process PMCH in the MBSFN subframe, it has to process the downlink scheduling (DL assignment).

Figure 7:
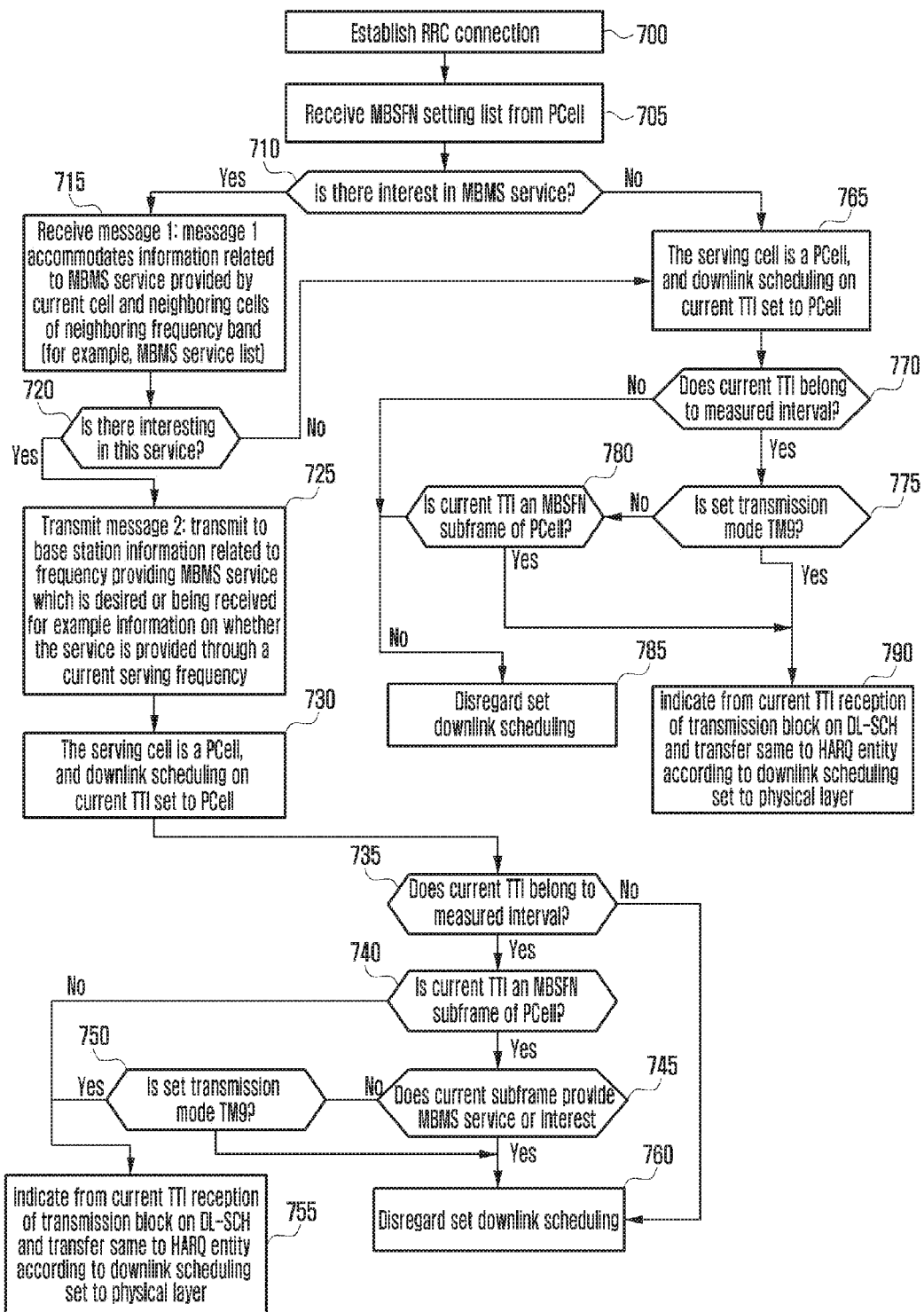
FIG. 7 is a flowchart illustrating an operation procedure of the UE according to an embodiment of the present invention.

FIG. 7 is a flowchart illustrating an operation procedure of the UE according to an embodiment of the present invention.

The UE performs RRC connection establishment at step 700. The UE receives MBSFN-SubframeConfigList in the SIB2 message of the PCell at operation 705.

The UE determines whether it is necessary to receive MBMS, according to the user's intention, at step 710. If it is necessary to receive MBMS, the UE receives the first message broadcast by the eNB at operation 715. The first message may be transmitted in the form of System Information (SI) and include information MBMS services provided on the frequencies of serving and neighbor cells. For example, the identifiers of the MBMS services provided by the serving and neighbor cells may be provided as sorted by frequency.

The UE determines whether the interested MBMS service is provided by the serving cell or neighbor cell (i.e. current cell or neighbor frequency) at step 720. It so, the UE sends the eNB an MBMS counting response message as the second message at operation 725. The second message includes the information related to the frequency on which the interested MBMS service is provided. For example, this corresponds to the information on whether the UE-interested MBMS service is provided by the serving cell, i.e. the frequency on which the UE-interested MBMS service is provided is the serving frequency.

The UE detects that the downlink scheduling (DL assignment) occurs at the current TTI at step 730. This assumes that the DL SPS is activated at a certain time and any downlink scheduling (DL assignment) configured by the activated SPS occurs at current TTI. Of course, the above operation is valid when the current serving cell is the PCell.

Then the UE determines whether the TTI corresponds to a measurement gap at operation 735. The measurement gap is the duration in which the serving cell performs no transmission in order for the UEs in the neighbor cell to perform measurement on the corresponding frequency.

If it is the measurement gap, the UE ignores the downlink scheduling (DL assignment) information at step 760.

Otherwise if it is not the measurement gap, the UE determines whether the TTI corresponds to MBSFN subframe at operation 740. Whether it is the MBSFN subframe may be checked by referencing the MBSFN subframe configuration list (Mbsfn-SubframeConfigList).

If it is not MBSFN subframe, the UE processes the downlink scheduling (DL assignment) at operation 755.

If it is MBSFN subframe, the UE determines whether the corresponding subframe carries the interested MBMS service at operation 745. If the interested MBMS service is included, the UE ignores the corresponding downlink scheduling (DL assignment) at operation 760.

Otherwise, if the interested MBMS service is not included, the UE determines whether the UE is configured in the TM9 at operation 750.

If it is not configured in TM9, this means that the MBSFN subframe cannot be used for unicast and the UE ignores the downlink scheduling (DL assignment) at operation 760.

Otherwise if it is configured in TM9, the UE processes the downlink scheduling (DL assignment) at operation 755.

Returning to FIG. 720, if the interested MBMS service is not provided in the current cell or on the neighbor frequencies, the UE detects that the occurrence of downlink scheduling (DL assignment) configured at current TTI at operation 765. The above operation is valid when the current serving cell is the PCell.

The UE determines whether the TTI corresponds to the measurement gap at step 770.

If it is the measurement gap, the UE ignores the downlink scheduling (DL assignment) information at step 785.

If it is not the measurement gap, the UE determines that it is configured in TM9 at operation 775.

If it is configured in TM9, the UE processes the downlink scheduling (DL assignment) at operation 790.

Otherwise if it is not configured in TM9, the UE determines whether the current TTI corresponds to an MBSFN subframe at step 780. The UE may check the MBSFN subframe configuration list (Mbsfn-SubframeConfigList) received in the SIB2 to verify the MBSFN subframe.

If the current TTI is the MBSFN subframe, the UE ignores the downlink scheduling (DL assignment) at step 785. Otherwise if the current TTI is not MBSFN subframe, the UE processes the downlink scheduling (DL assignment) at operation 790.

If it is determined that the UE is configured in TM9 at step 775, the UE processes the downlink scheduling (DL assignment) immediately. However, instead of the downlink data, the MBSFN service may be transmitted at the corresponding TTI. In this case, there may be transmission error in the processed downlink scheduling (DL assignment) such that the UE may send the eNB a NACK. Since the eNB is retransmitting the corresponding data, it is not any operation error.

According to another embodiment of the present invention, although the UE determines whether the TTI is MBSFN subframe by referencing the MBSFN subframe configuration list (Mbsfn-SubframeConfigList) received in SIB2, the subframe indicated as MBSFN subframe in the MBSFN subframe configuration list (Mbsfn-SubframeConfigList) may be used for the purpose of unicast.

Accordingly, after determining whether the subframe carries MBSFN service finally at step 430 of FIG. 4, it is possible to process the downlink scheduling (DL assignment) at step 785.

Figure 8:
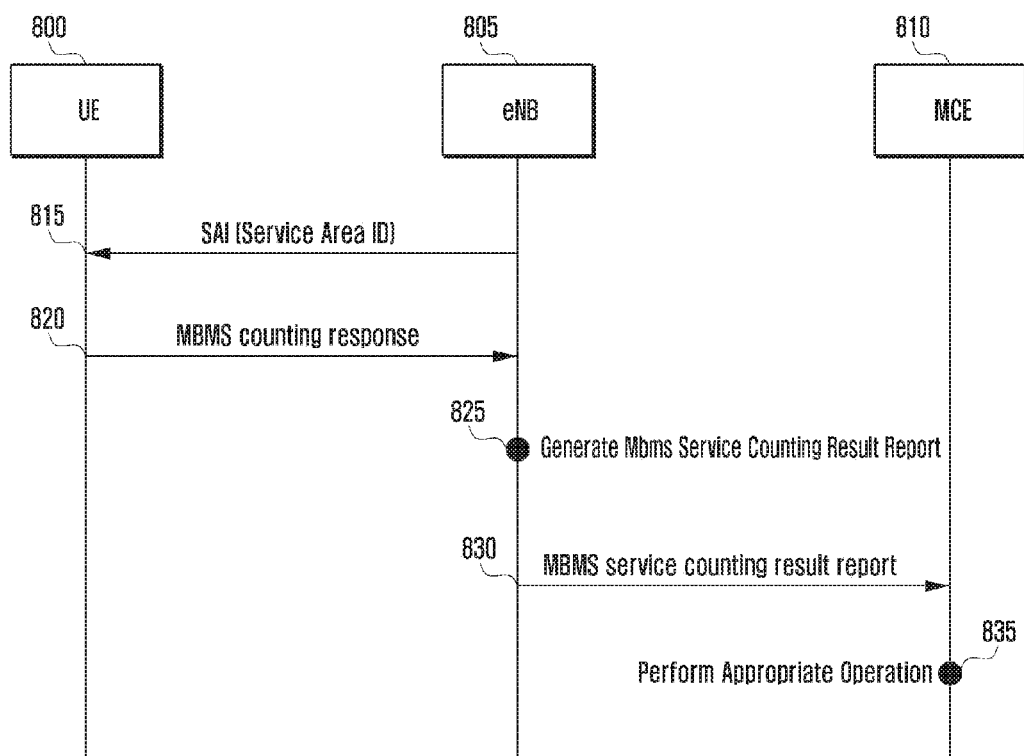
FIG. 8 is a diagram for explaining an MBMS counting request/response procedure in detail.

FIG. 8 is a diagram for explaining an MBMS counting request/response procedure in detail.

The MBMS counting request/response procedure has been mentioned at steps 715 and 725 of FIG. 7. In more detail, the eNB 805 provides the UE 800 with the MBMS service information at operation 815. This information is broadcast in the form of System Information (SI), legacy SIB or newly defined SIB. The corresponding message is a COUNTING REQUEST message transmitted to a plurality of unspecific UEs. The COUNTING REQUEST message may be transmitted through MCCH and include following informations.

(1) MBMS service identifier
(2) information on frequency layer providing or to be used for providing MBMS service The above message may include only the list of frequencies for providing MBMS service, the MBMS service provided through a certain frequency may be determined by the UE through a certain method, e.g. based on MBMS service guide information provided to the UE. The eNB transmits the COUNTING REQUEST message through the cells operating on all frequency layers.

If the message is received from the eNB and if the UE is receiving or wants to the corresponding MBMS service, it may send the eNB a COUNTING RESPONSE message. For this purpose, the UE sends the eNB an MBMS COUNTING RESPONSE message at step 820.

The MBMS COUNTING RESPONSE message includes the information on the frequency for providing UE-interested MBMS service. In detail, the UE served by a cell of the frequency layer which does not provide the MBMS service may indicates this in the COUNTING RESPONSE message, which may include the following informations.

(1) Identifier of MBMS service which is currently received or wanted to receive among the MBMS services included in the COUNTING REQUEST message Information indicating whether the frequency layer on which the MBMS service received currently or wanted to receive is provided is the serving frequency (In the case that Carrier aggregation is configured, it may indicate whether the frequency layer is the frequency layer of the PCell or SCell).

The eNB generates an MBMS Service Counting Results Report based on the information included in the COUNTING RESPONSE message received in the cells control by it at step 825. This message include following informations.

(1) number of UEs which is interested in or receiving the corresponding MBMS service, per MBMS service (2) number of UEs having the frequency layer providing the MBMS service thereon as the serving frequency and number of UEs having that frequency layers as non-serving frequencies among the UEs which are interested in or receiving the corresponding MBMS service, per MBMS service.

According to another embodiment of the present invention, the following information may be included.

(3) number of UEs which are interested in or receiving the corresponding MBMS service per frequency layer The eNB sends the Multi-cell/multicast Coordination Entity (MCE) the MBMS Service Counting Results at operation 830. Then the MCE performs necessary operation based on the counting result at step 835. For example, if there are too may UEs to perform inter-frequency handover for receiving a certain MBMS service, MCE may determine to provide the MBMS service on multiple frequency layers and perform the process required for this.

Figure 9:
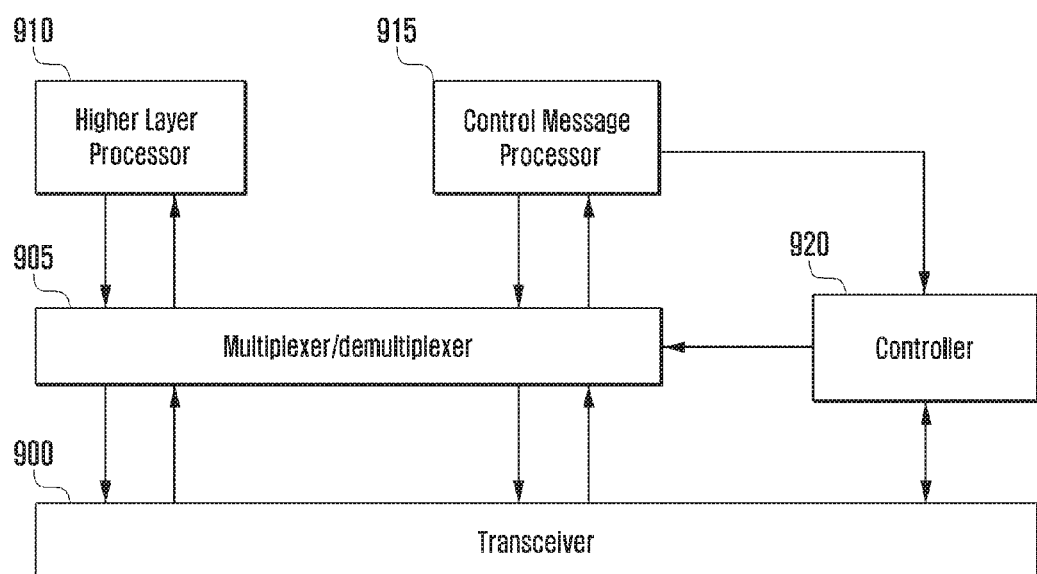
FIG. 9 is a block diagram illustrating a configuration of the UE according to an embodiment of the present invention.

FIG. 9 is a block diagram illustrating a configuration of the UE according to an embodiment of the present invention.

The UE transmits and receives data to and from higher layers 910 and transmits and receives controls messages through the control message processor 915. When the UE transmits a control signal or data to the eNB, the control signal or data are multiplexed by the multiplexer/demultiplexer 905 and then transmitted through the transceiver 900 under the control of the controller. In reception mode, the UE receives physical signal by means of the transceiver 900, demultiplexes the received signal by means of the modulator/demodulator 905, and delivers the demodulated signal to the higher layer processor 910 or the control message processor 915.

Although the drawing is directed to the case where the UE includes a plurality of blocks responsible for different functions, this is just an exemplary embodiment and the present invention is not limited thereto. For example, the functions of the multiplexer/demultiplexer 905 may be performed by the controller 920.

In this case, the controller 920 may detects the occurrence of downlink scheduling at a certain Transmission Time Interval (TTI). The controller 920 determined whether to process the downlink scheduling depending on whether the UE is configured in TM9 or the TTI matches the MBSFN (Multimedia Broadcast multicast service Single Frequency Network) subframe. The controller 920 controls the UE to process or ignore the downlink scheduling according to the determination result.

In more detail, the controller 920 determines whether the TTI matches the measurement gap and, if so, controls to ignore the downlink scheduling.

If the TTI does not match the measurement gap, the controller 920 determines whether the UE is configured in TM9 and, if not configured in TM9, determines whether the TTI matches an MBSFN subframe and, if so, controls to ignore the downlink scheduling.

If the TTI does not match any MBSFN subframe, the controller 920 controls to process the downlink scheduling.

If the UE is configured in TM9, the controller 920 controls to process the downlink scheduling.

Figure 10:
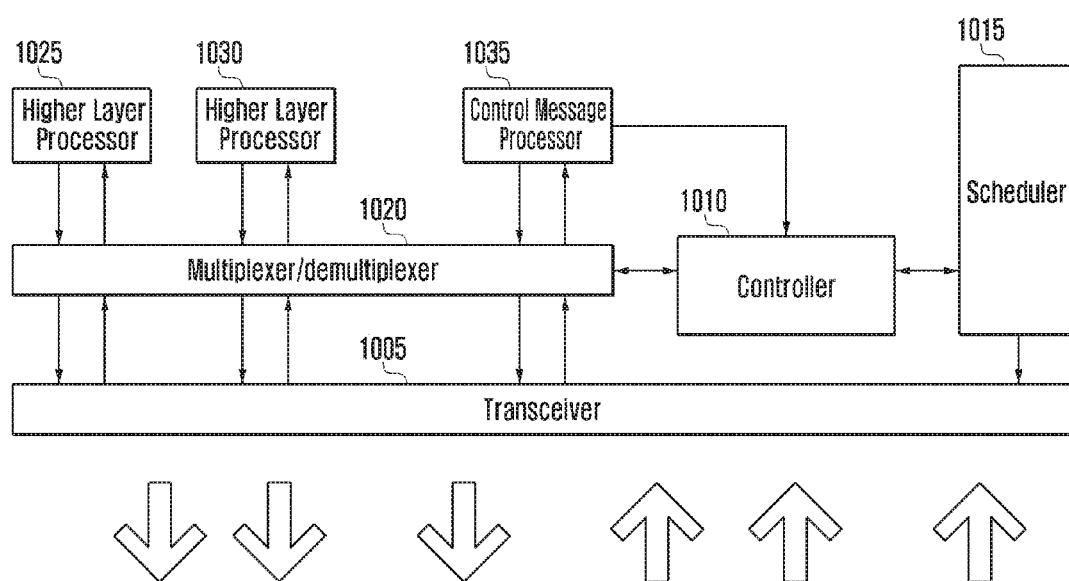
FIG. 10 is a block diagram illustrating a configuration of the eNB according to an embodiment of the present invention.

FIG. 10 is a block diagram illustrating a configuration of the eNB according to an embodiment of the present invention. As shown in FIG. 10, the eNB of the present invention includes a transceiver 1005, a controller 101, a multiplexer/demultiplexer 1020, a control message processor 1035, higher layer processors 1025 and 1030, and a scheduler 1015.

The transceiver 1005 transmits data and control signals on downlink carriers and receives data and control signals on uplink carriers. In the case that a plurality of carriers is configured, the transceiver 1005 may transmit and received data and control signals over a plurality of carriers.

The multiplexer/demultiplexer 1020 multiplexes the data generated by higher layer processors 1025 and 1030 and the control message processor 1035 and demultiplexes the data received through the transceiver 1005 and delivers the demultiplexed data to the higher layer processors 1025 and 1030, control message processor 1035, and/or the controller 1010. The control message processor 1035 may takes an action necessary for processing the control message transmitted by the UE and delivers the controls message to be transmitted to the UE to the higher layer.

The higher layer processors 1025 and 1030 may be formed per UE per service and processes the data generated in the user service such as FTP and VoIP to transfer the processed data to the multiplexer/demultiplexer 1020 or processes the data output from the multiplexer/demultiplexer 1020 to transfer the processed data to the service applications of the higher layer.

The control unit 1010 determines the timing of MBMS transmission and control the transceiver for MBMS transmission.

The scheduler 1015 allocates transmission resource to the UE at an appropriate timing in consideration of the buffer state, channel state, and active time of the UE and controls the transceiver to process the signal transmitted by or to be transmitted to the UE.

The specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method by a terminal in a mobile communication system, the method comprising:
   receiving configuration information for a multimedia broadcast/multicast service frequency network (MBSFN) subframe;
   receiving a downlink assignment to receive a physical downlink shared channel (PDSCH) for a first transmission time interval (TTI); and
   when the terminal is configured with a transmission mode 9 and a subframe corresponding to a second TTI is the MBSFN subframe based on the configuration information:
      receiving a physical multicast channel (PMCH) in the subframe if the second TTI is different from the first TTI, and
      receiving the PDSCH in the subframe based on the downlink assignment if the second TTI corresponds to the first TTI.

2. The method of claim 1, further comprising:
   identifying whether a measurement gap is not configured in the first TTI.

3. The method of claim 2, wherein the receiving of the PDSCH in the subframe based on the downlink assignment comprises:
   if the measurement gap is not configured in the first TTI, receiving the PDSCH in the subframe based on the downlink assignment.

4. The method of claim 1, further comprising:
   if the subframe corresponding to the second TTI is not the MBSFN subframe, receiving the PDSCH in the subframe based on the downlink assignment.

5. The method of claim 1, wherein the downlink assignment is configured through an activated semi-persistent scheduling.

6. The method of claim 1, wherein the configuration information comprises an MBSFN subframe configuration list included in the system information block type 2.

7. The method of claim 6, wherein the MBSFN subframe is indicated by the MBSFN subframe configuration list.

8. A terminal in a mobile communication system, the terminal comprising:
   a transceiver configured to transmit and receive signals to and from a base station; and
   a controller configured to:
      control the transceiver to receive configuration information for a multimedia broadcast/multicast service frequency network (MBSFN) subframe,
      receive a downlink assignment to receive a physical downlink shared channel (PDSCH) for a first transmission time interval (TTI), and
      when the terminal is configured with a transmission mode 9 and a subframe corresponding to a second TTI is the MBSFN subframe based on the configuration information:
         receive a physical multicast channel (PMCH) in the subframe if the second TTI is different from the first TTI, and
         receive the PDSCH in the subframe based on the downlink assignment if the second TTI corresponds to the first TTI.

9. The terminal of claim 8, wherein the controller is further configured to identify whether a measurement gap is not configured in the first TTI.

10. The terminal of claim 9, wherein the controller is further configured to, if the terminal is configured with the transmission mode 9, the subframe corresponding to the second TTI is the MBSFN subframe based on the configuration information and the measurement gap is not configured in the first TTI, receive the PDSCH in the subframe based on the downlink assignment.

11. The terminal of claim 8, wherein the controller is further configured to, if the subframe corresponding to the second TTI is not the MBSFN subframe, receive the PDSCH in the subframe based on the downlink assignment.

12. The terminal of claim 8, wherein the downlink assignment is configured through an activated semi-persistent scheduling.

13. The terminal of claim 8, wherein the configuration information comprises an MBSFN subframe configuration list included in the system information block type 2.

14. The terminal of claim 13, wherein the MBSFN subframe is indicated by the MBSFN subframe configuration list.

* * * * *